United States Patent [19]

Chasens

[11] E Re. 31,399

[45] Reissued Sep. 27, 1983

[54] VERTICAL COIL FOR A DEFLECTION YOKE

[75] Inventor: Bernard Chasens, El Paso, Tex.

[73] Assignee: General Instrument Corp., Clifton, N.J.

[21] Appl. No.: 420,012

[22] Filed: Sep. 20, 1982

Related U.S. Patent Documents

Reissue of:

[64] Patent No.: 4,003,012
Issued: Jan. 11, 1977
Appl. No.: 620,944
Filed: Oct. 9, 1975

[51] Int. Cl.[3] ..... H01H 1/00; H01H 5/00

[52] U.S. Cl. ..... 335/213; 335/210

[58] Field of Search ..... 335/213, 210

[56] References Cited

U.S. PATENT DOCUMENTS

| | | | |
|---|---|---|---|
| 3,310,763 | 3/1967 | Thompson | 335/213 |
| 3,375,389 | 3/1968 | Hughes | 335/213 |
| 3,733,507 | 5/1973 | Cassett et al. | 335/213 |
| 3,757,262 | 9/1973 | Over et al. | 335/213 |
| 3,846,659 | 11/1974 | Cassett et al. | 313/417 |

FOREIGN PATENT DOCUMENTS

| | | |
|---|---|---|
| 1210090 | 8/1966 | Fed. Rep. of Germany . |
| 113649 | 8/1966 | Netherlands . |

*Primary Examiner*—Harold Broome
*Attorney, Agent, or Firm*—James & Franklin

[57] ABSTRACT

A vertical coil for a deflection yoke designed for use with a tri-gun in-line cathode ray tube includes a core comprising a semi-circular split core part and a winding formed of continuous wire turns on the core part. The winding comprises first and second sections and one or more crossover turns connecting the sections. The sections are circumferentially spaced from each other along the core part with the crossover turns extending therebetween on the outer surface of the core. The sections define an area on the inner surface of the core extending from the interior to the exterior edge thereof which is substantially devoid of crossover turns. This configuration serves to generate a magnetic field which converges the beams along the vertical center axis of the tube screen without additional circuitry, auxiliary windings or other means to achieve this result.

8 Claims, 4 Drawing Figures

VERTICAL COIL FOR A DEFLECTION YOKE

Matter enclosed in heavy brackets [ ] appears in the original patent but forms no part of this reissue specification; matter printed in italics indicates the additions made by reissue.

The present invention relates to deflection yokes for tri-gun in-line cathode ray tubes and, more particularly, to a toroid vertical winding for such a deflection yoke which produces a magnetic field for converging the electron beams along the vertical center line of the cathode ray tube without additional circuitry or auxiliary windings.

A tri-gun in-line cathode ray tube has three electron-beam-producing guns, one gun for each of the red, blue and green colors. The guns are equally spaced from each other and situated in a single plane. In order to achieve the desired picture quality, it is necessary that each of the three electron beams converge at the interior surface of the screen portion of the tube. This convergence of the beams is achieved through the production of a magnetic field which alters the path of the beams such that all three converge at the appropriate location.

One of the types of deflection yokes used on a cathode ray tube conventionally includes a toroid vertical winding characterized by a series of continuous turns wound about a semi-circular split ferrite core. A winding of this nature produces a magnetic field which normally diverges the three in-line electron beams along the vertical center axis of the tube thereby requiring additional convergence circuitry in the television receiver to reconverge the three beams at a distance from the guns which coincides with the screen.

An engineering analysis of the magnetic field generated by a toroid vertical winding indicates that the additional convergence circuitry normally required to converge the vertical center axis when the winding is situated along the entire active portion of the core can be eliminated if a portion of the magnetic field generated at the center of the winding can be sufficiently weakened or cancelled. One attempt to achieve this result has utilized a plurality of auxiliary wire turns at the center of the winding which are wound in a direction opposite to the remainder of the winding so as to cancel the magnetic field in the area of the additional turns.

Another attempt to achieve this result has been to form the winding with a partial opening or window in the center thereof, thereby to minimize the field produced in this area. Apparently, the advantages of a full window or opening in the center of the winding have not been recognized by the industry. The closest attempt to this ideal situation has involved the formation of ill-defined windows or openings, ones with crossover turns extending along the inner surface of the core. The result has been that the field has not been sufficiently minimized and vertical self-convergence of the electron beams along the vertical center line of the tube is not completely achieved. This is because the angle of wind, defined to be the angle formed at the point of intersection of lines drawn along the turns at each of the extreme ends of the winding, must be increased to an angle greater than the normal angle of wind to compensate for the crossover turns which appear in the window, in order to achieve convergence. However, increasing the angle of wind increases the raster distortion, especially at the left and right-hand portions of the screen. Thus, a vertical straight line at the extreme left-hand or right-hand edge of the screen will appear more bowed as the angle of wind increases. Normally, circuitry is included in the television set in order to compensate for a certain amount of this distortion. However, when the angle of wind is increased, a larger correction of the raster distortion is required, thereby requiring more power from this correction circuitry to straighten the sides of the picture.

It should also be noted that the width of the void or window in the center of the split toroid winding determines the angle of wind. Thus, the width of the center void for a given angle of wind is limited because at some point the magnetic field over-corrects the beams so that they are no longer self-converging but over-converged. The over-converged condition is an objectionable as the under-converged condition because both conditions cause the outer beams to diverge from the center beam.

It is, therefore, a prime object of the present invention to provide a toroid vertical winding for a deflection yoke which achieves optimal self-convergence of the electron beams along the vertical center line of the tube without the necessity of additional convergence circuitry or auxiliary windings.

It is another object of the present invention to provide a toroid vertical winding for a deflection yoke which has a clearly defined opening or void in the central portion thereof.

It is a further object of the present invention to provide a toroid vertical winding for a deflection yoke which is formed in two sections and which has no crossover turns on the interior surface of the core.

In accordance with the present invention, a deflection yoke vertical coil of the type used in conjunction with a tri-gun in-line cathode ray tube is provided. The vertical coil comprises a core and a winding formed of continuous wire turns. The winding has first and second sections and one or more crossover turns connecting the sections. The sections are circumferentially spaced from each other along the core with the crossover turns extending therebetween on the outer surface of the core. The sections define an area on the inner surface extending from the interior to the exterior edge of the core which is substantially devoid of crossover turns.

The winding sections are situated such that at the smallest point, the width of the area which is devoid of turns is substantially larger than the thickness of a turn. Preferably, the core comprises a pair of semi-circular split core parts, the first and second winding sections are situated on the same core part and the area devoid of windings is located substantially at the central portion thereof.

The core is outwardly flared and the area devoid of windings follows the contours of the inner surface of the core and, therefore, the width of this area increases in accordance with the outward flare of the core.

To the accomplishment of the above and to such other objects as may hereinafter appear, the present invention relates to a toroid vertical winding for a deflection yoke as defined in the annexed claims and as set forth in the specification taken together with the accompanying drawings wherein like numerals refer to like parts and in which:

Figure 1:
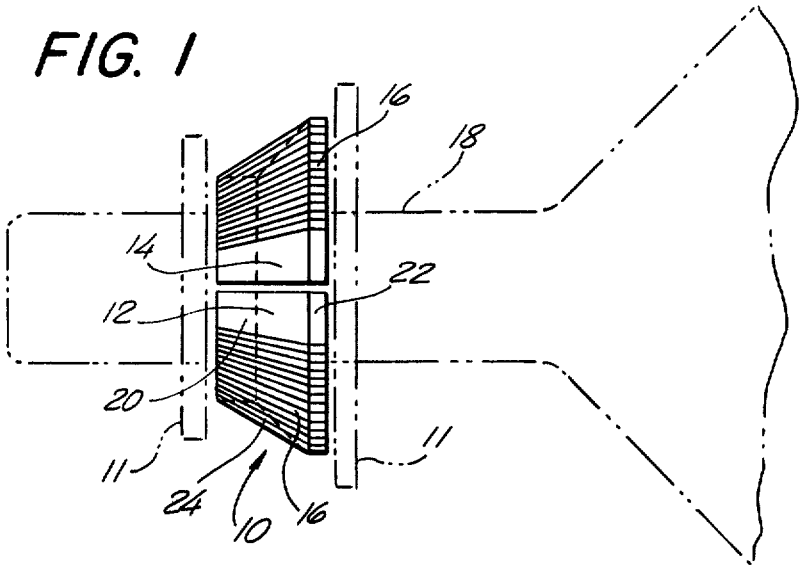
FIG. 1 is a side elevational view of the toroidal vertical coil of a deflection yoke mounted on a cathode ray tube.

As shown in FIG. 1, the deflection yoke's toroidal vertical coils, generally designated 10, includes a pair of split semi-circular ferrite cores 12, 14. Cores 12, 14 are located between insulators 11 which contain the horizontal coils of the yoke. On each of the cores 12, 14 is a separate toroidal vertical winding 16 formed by a series of continuous turns. The core parts 12, 14, when assembled, form a ring-like structure having an opening in the middle through which the neck 18 of a cathode ray tube extends. Cathode ray tube 18 is of the type having three electron guns, all of which are situated in a single plane. The energization of the vertical windings 16 of the deflection yoke alters the path of travel of the electron beams as they travel down the neck 18 of the cathode ray tube towards the picture screen.

Figure 2:
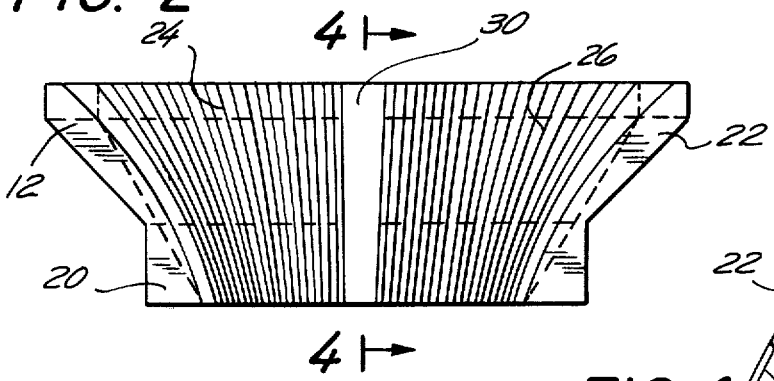
FIG. 2 is an elevational view of the interior surface of the deflection yoke coil of the present invention.
Figure 4:
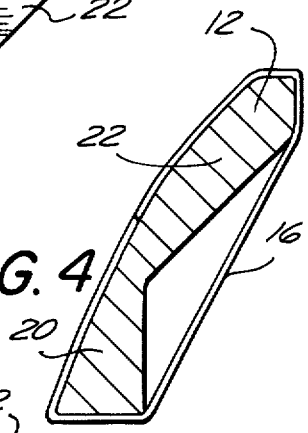
FIG. 4 is a cross-sectional view taken along line 4—4 of FIG. 2.
Figure 3:
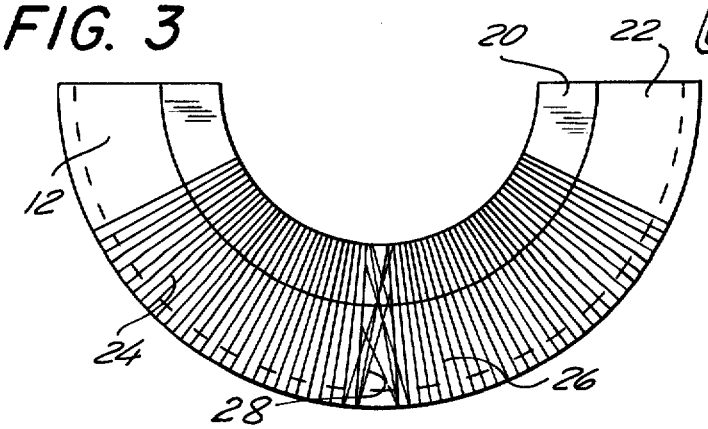
FIG. 3 is an elevational view of the outer surfaces of the deflection yoke coil of the present invention.

As best seen in FIGS. 2 and 4, core 12 has a substantially cylindrical portion 20 and a flared portion 22, preferably integral therewith. Winding 16 is divided into two sections 24, 26 which are circumferentially spaced from each other along core 12. A number of crossover turns 28 are provided between sections 24 and 26 such that the sections can be wound continuously. The spacing of sections 24 and 26 leaves a void or window 30 between the sections at approximately the central portion of the core. As shown in FIG. 2, section 30 on the inner surface of core 12 is devoid of all crossover turns 28. Since these crossover turns are necessary, the winding is fashioned such that all of the crossover turns 28 appear on the outer surface of the core, as seen in FIG. 3, such that they have little or no effect on the magnetic field generated by the winding.

It can be seen that the width of area 30 at its smallest point is substantially larger than the thickness of a turn. Section 22 is outwardly flared. Area 30 follows the contours of the inner surface of the core and, thus, is wider at the exterior edge of core 16 than at the interior edge thereof. The width of area 30, therefore, increases in accordance with the outward flare of the core. In fact, if lines were to be drawn parallel to the sides of area 30, these lines would intersect or converge at a point spaced from the interior edge of the core.

The presence of this well-defined area devoid of crossover turns on the inner surface of the core permits the deflection yoke to generate a magnetic field which causes the electron beams to self-converge along the vertical center line of the tube and, thus, eliminates the necessity for any additional convergence circuitry or auxiliary turns to achieve this result. In addition, because area 30 on the inner surface has no crossover turns therein, there is no necessity to increase the angle of wind to compensate for the turns appearing in the void. Thus, the burden on raster distortion compensation circuitry is not increased.

It also should be noted that the particular cross-sectional shape of the core as well as the size and width of area 30, as shown in the drawings, are merely exemplary and should not be considered a limitation on the present invention. These structural configurations are disclosed herein for purposes of illustration only.

It is obvious that many modifications and variations can be made on the specific structure disclosed herein. It is intended to cover all of these variations and modifications which fall within the scope of the present invention as defined by the annexed claims.

What is claimed is:

1. A deflection yoke coil of the type for use with a tri-gun in-line cathode ray tube, said yoke coil comprising a core and a winding formed of continuous wire turns, said winding comprising first and second sections and [one or] more *than one* crossover turn[s] connecting said sections, said sections being spaced from each other along said core with said crossover turns extending therebetween on the outer surface of said core, said sections defining an area on the inner surface of said core extending from the interior to the exterior edge of said core which is substantially devoid of crossover turns.

2. The yoke coil of claim 1 wherein the width of said area at the smallest point is substantially larger than the wire diameter of a turn.

3. The yoke coil of claim 1 wherein said core is outwardly flared and wherein said area follows the contours of the inner surface of the core.

4. The yoke coil of claim 3 wherein the width of said area increases in accordance with the outward flare of the core.

5. The yoke coil of claim 1 wherein said core comprises a pair of semi-circular split core parts, said first and said second winding sections being situated on the same core part.

6. The yoke coil of claim 5 wherein said area is located substantially at the central portion thereof.

7. The winding of claim 1 wherein lines drawn parallel to the sides of said area converge at a point spaced from the interior edge of the core.

8. The yoke coil of claim 5 wherein said sections are circumferentially spaced along said core part.

* * * * *